May 21, 1968 J. P. LAUER 3,383,787
MARKER CONSTRUCTION FOR USE IN LAWN AREAS
Filed July 30, 1964 2 Sheets-Sheet 1
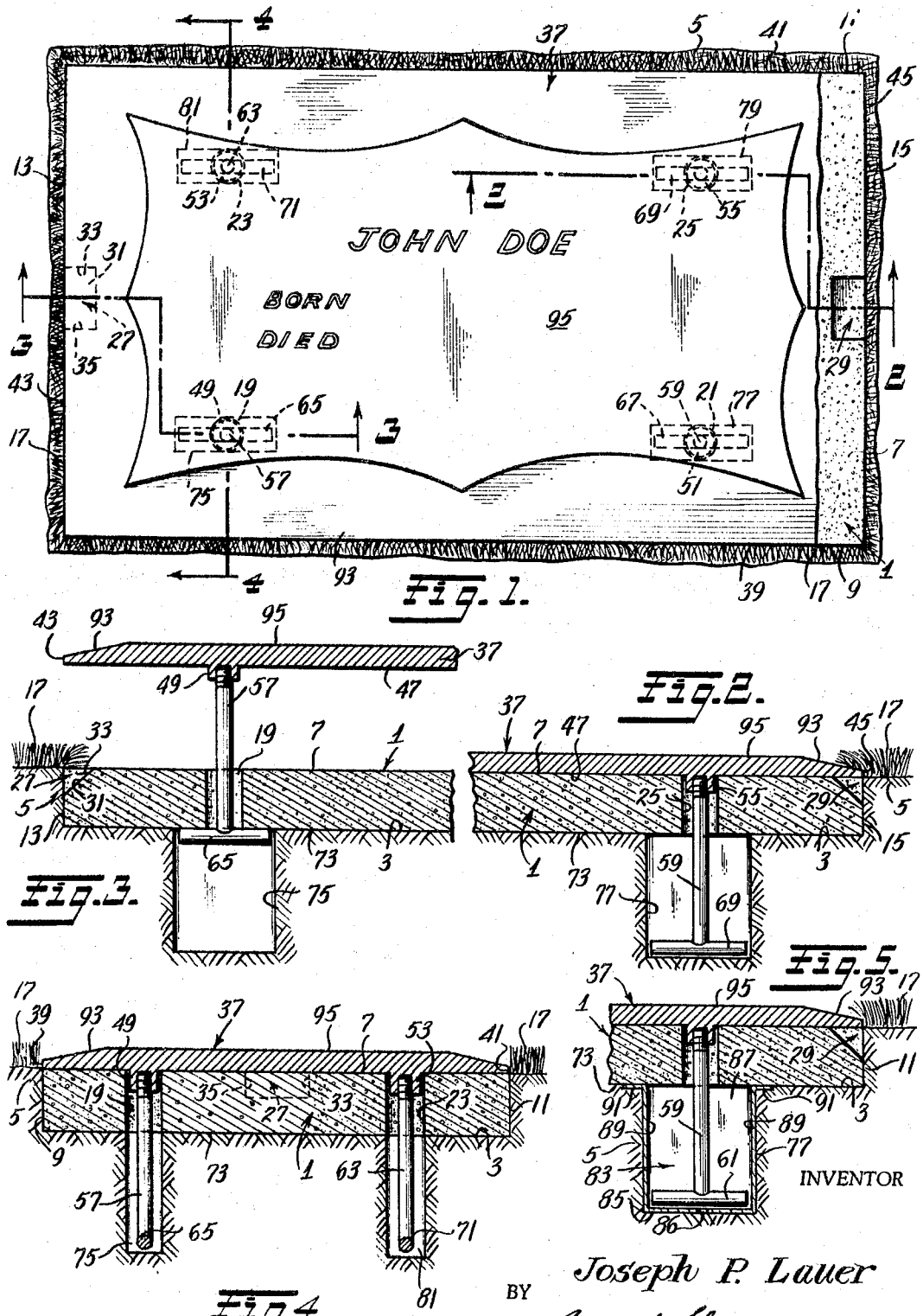
INVENTOR
Joseph P. Lauer
BY
Bacon & Thomas ATTORNEYS

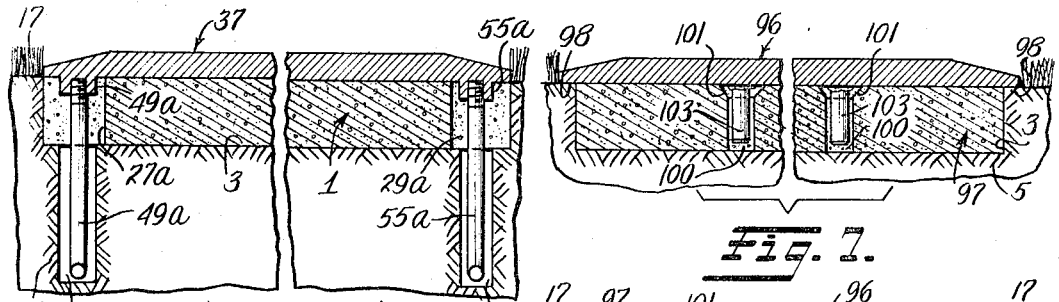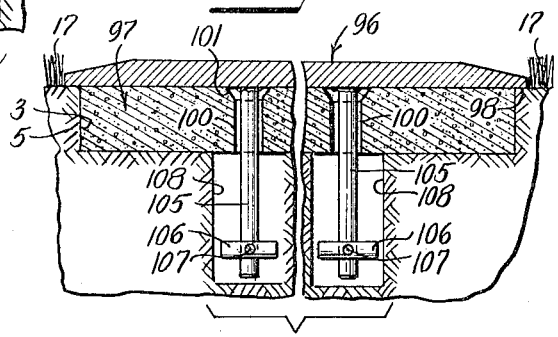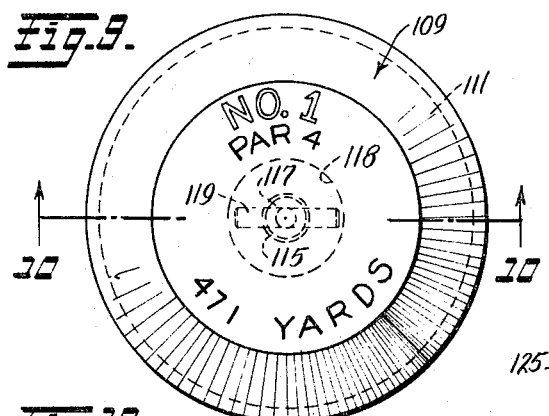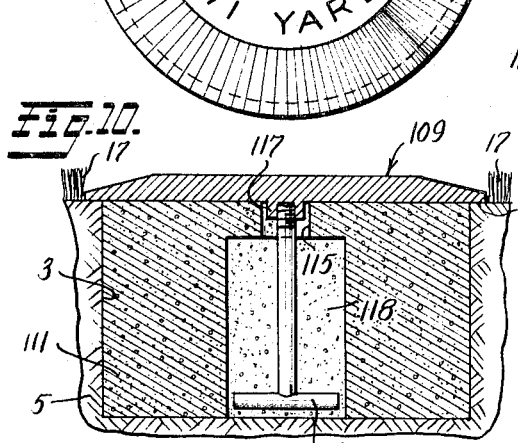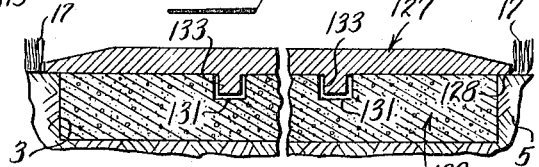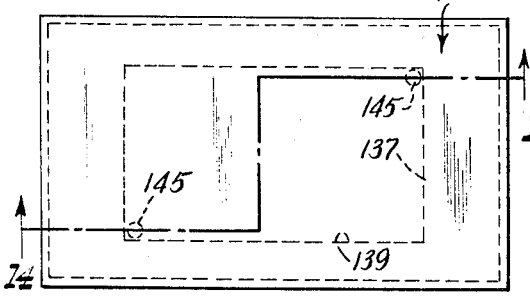

United States Patent Office 3,383,787
Patented May 21, 1968

3,383,787
MARKER CONSTRUCTION FOR USE
IN LAWN AREAS
Joseph P. Lauer, Costa Mesa, Calif., assignor to Underground Vaults, Inc., Newport Beach, Calif., a corporation of California
Filed July 30, 1964, Ser. No. 386,192
23 Claims. (Cl. 40—124.5)

This invention relates to a marker construction for use in lawn areas, said marker being purposely constructed so as to eliminate the necessity of hand or mechanical trimming of the lawn along the marginal edges of the marker.

The fundamental and broad, basic concept of the present invention resides in the combination of a marker plate or tablet, and a base designed so that trimming of the grass or other vegetation at the edges of the marker plate can be eliminated simply by raising the marker plate above the base to a height above the surrounding grass or other vegetation, and then lowering the marker plate back onto the base. The simple act of lowering the marker plate will depress and entrap beneath it the previously overlying vegetation and instantly present a neat and attractive border at the edges of the plate.

Markers made in accordance with the principles of the present invention can be designed to serve various purposes, and to be used in numerous different environments. For example, the present marker can be used for memorial tablets, generally: for marking historic sites, commemorating historical events; and particularly as memorial tablets for use in lawn-type cemeteries. The marker can also be used for more functional purposes, such as curb-side road markers for indicating the names of streets; distance markers for highways; general direction indicators; tee-hole numbers and yardage markers on golf courses, etc.

The present marker can be made of any suitable material and of any desired shape and size, and comprises essentially a marker plate or tablet and a supporting base: with or without means for limiting vertical movement of the tablet relative to the base; with or without means for guiding such vertical movement; with the guide means contained within the base or projecting therethrough and therebelow; with the tablet at least as large or larger than its supporting base; and, in the absence of guide means, preferably with some means for indexing and maintaining the tablet and base in proper registering position when in use.

Inasmuch as the anticipated broadest field of use for the present invention will be in connection with lawn-type cemeteries, one embodiment of the present invention will be described, by way of example and not by way of limitation, in connection with such use.

At the present time, many cemeteries require that all memorials and grave markers or tablets be installed substantially flush with the surface of the ground in order to provide a lawn-type cemetery having a pleasing appearance, and to reduce maintenance expense. By installing all of the memorials and grave markers at ground level, the grass may be cut quickly and efficiently by power mowers which can pass directly over the memorials and markers.

In such lawn-type cemeteries, however, the grass or other plant life growing close around the marginal edges of the memorial tablets inherently tends to grow over and to lie close to the surface of the tablets. This vegetation, which is not entirely removed by the power mowers as they pass over the tablets, is unsightly and its removal requires substantial labor and maintenance expense.

It is, therefore, the primary object of this invention to provide an improved marker construction for use in lawn areas in general, and in lawn-type cemeteries in particular, which is designed to eliminate the expense and maintenance involved in removing unsightly grass extending over the marginal edges of the marker.

Another object is to provide a lawn-type marker that is designed to be raised above any overlying grass, etc., and then to be lowered to rest upon, and thus, in effect, "trim" the grass at the marginal edges of the marker.

A further object is to provide a marker and an associated base member that are cooperable to destroy grass and/or other plant life that encroaches upon the marker.

A still further object is to provide a metal marker and a concrete slab that eliminate encroaching vegetation simply by lifting the marker relative to the slab and then lowering the marker to entrap the encroaching vegetation between the marker and slab to thus destroy said vegetation.

Another object is to provide a marker and a supporting base, together with means for aiding in positioning and maintaining the marker in registration with the base.

Still another object is to provide a marker plate or tablet and a relatively heavy base that are interconnected to prevent theft of the marker plate by vandals, and at the same time permit limited vertical movement of the marker plate relative to the base for a "trimming" operation.

A still further object is to provide various marker constructions that are attractive in appearance, sturdy, long-lasting and economical to manufacture, and which will meet various ornamental and functional needs.

These and other objects and advantages of the invention will become more apparent from the following description and claims when taken in conjunction with the drawings, in which:

FIG. 1 is a plan view, partially broken away, showing a lawn-type marker including a tablet mounted upon a concrete foundation slab set in a recess formed in the earth at a selected site, for example, a grave site;

FIG. 2 is a fragmentary, cross-sectional view, taken on line 2—2 of FIG. 1, showing the tablet in its normal, lowered position, seated on the concrete slab and with vegetation partially overlying the upper surface of the tablet;

FIG. 3 is a fragmentary, cross-sectional view, taken on line 3—3 of FIG. 1, showing the tablet in its raised position limited by a T-headed bolt, but spaced above the concrete slab and vegetation, and with the vegetation now partially overlying the upper surface of the concrete slab;

FIG. 4 is a cross-sectional view, taken on line 4—4 of FIG. 1, showing the tablet in its lowered position to effect a "trimming" operation;

FIG. 5 is a fragmentary, cross-sectional view, similar to FIG. 2, showing a modified form of the invention wherein a receptacle is provided for the T-headed bolt;

FIG. 6 is a fragmentary cross-sectional view similar to FIG. 2, wherein the slab is notched throughout its height and a T-headed bolt extends through the notch;

FIG. 7 is a vertical cross-sectional view of an embodiment of the invention wherein the tablet projects beyond the marginal edges of the base, and wherein the guide means is contained within the base and constructed to allow unrestricted vertical movement of the tablet relative to the base;

FIG. 8 is a cross-sectional view similar to FIG. 7 but illustrating an embodiment of the invention wherein a latch member is pivotally mounted at the lower end of the guide to permit ready assembly and disassembly of the tablet and base, and to limit vertical movement of the tablet relative to the base after installation;

FIG. 9 is a plan view of a circular embodiment of the invention wherein the marker plate is larger than the base particularly designed for use as a distance marker on golf courses;

FIG. 10 is a vertical sectional view taken on the line

10—10 of FIG. 9, showing the guide means contained within the base;

FIG. 11 is a vertical cross-sectional view through another embodiment of the invention, in which the marker plate or tablet has a marginal flange providing a recess to receive the base;

FIG. 12 is a vertical cross-sectional view through another embodiment of the invention wherein the marker plate extends beyond the edges of the base, and wherein cooperating indexing means are provided to effect proper registration of the plate with the base; and FIGS. 13 and 14 illustrate still another embodiment of the invention.

One embodiment of the invention is illustrated in FIGS. 1 to 4 and includes a base or slab 1 disposed in a recess 3 formed in the earth 5, with the upper surface 7 of the slab 1 positioned substantially flush with the surface of the earth. The slab 1 may be made of concrete or any other suitable material. The concrete slab 1 is shown as rectangular but can be made of any other desired geometric shape or artistic configuration such as, a circle, an oval, heart or diamond-shape, etc. The slab 1 has side walls 9 and 11, and end walls 13 and 15 that are closely confined by the surrounding earth 5 and grass or other vegetation 17 growing in said earth surrounding said slab.

The concrete slab 1 is formed with symmetrically arranged circular guide openings 19, 21, 23 and 25 extending vertically therethrough. The openings 19 and 21 are located adjacent the side wall 9 while the openings 23 and 25 are located adjacent to the side wall 11. The openings 19 and 23 are adjacent to the end wall 15. Here again, the openings can be made square, rectangular, etc., instead of circular, and two instead of four can be used, if desired.

The upper surface 7 of the slab 1 is formed with recesses or lift pockets 27 and 29 at the ends 13 and 15, respectively. The recess 27 is formed in the upper surface 7 and in the end wall 13 midway between the side walls 9 and 11. The recess 27 has a bottom wall 31 and side walls 33 and 35. The bottom wall 31 is inclined at an angle of approximately 45 degrees to the upper surface of the slab and to the end wall 13 thereof. The width of the recess 27 between the side walls 33 and 35 is sufficient to receive a lifting device or the fingers of a maintenance worker. The recess 29, which is formed in the upper surface 7 and the end wall 15 at the other end of the slab midway between the side walls 9 and 11 is similar to the recess 27 already described.

A marker plate or tablet 37, preferably formed of bronze or some other suitable material, such as, corrosion resistant iron or steel, granite, marble, slate, etc., that is not affected by the elements, is positioned over the concrete slab 1. The configuration of the tablet 37 is substantially the same as that of the slab 1, and thus the side walls 39 and 41 and the end walls 43 and 45 of the metal tablet 37 coincide with the side walls 9 and 11 and the end walls 13 and 15, respectively, of the slab 1.

When made of metal, the lower surface 47 of the tablet 37 is formed with circular, depending, internally threaded lugs 49, 51, 53 and 55, which are in axial alignment with the circular guide openings 19, 21, 23 and 25, respectively. The lugs 49, 51, 53 and 55 are preferably formed integral with the tablet 37 and are sufficiently smaller in diameter than the respective guide openings 19, 21, 23 and 25, so that they are readily movable therein when the tablet 37 is raised and lowered. Each of the threaded lugs 49, 51, 53 and 55 has mounted therein an axially extending T-shaped bolt 57, 59, 61 and 63, respectively, having heads 65, 67, 69 and 71, respectively. Heads 65, 67, 69 and 71 are sufficiently larger than the corresponding guide openings 19, 21, 23 and 25 in the concrete slab 1 to prevent the heads from passing through the openings.

The bolts 57, 59, 61 and 63 are made sufficiently longer than the thickness of the slab 1 (over 2½ times), in order to permit the tablet 37 to be moved vertically a distance of approximately 3 inches before the T-shaped heads 65, 67, 69 and 71 come into contact with the lower surface 73 of the slab 1. In order to provide for vertical movement of the T-shaped bolt heads in the earth 5, suitable holes or cavities 75, 77, 79 and 81 are formed in the earth in alignment with the respective bolt heads the cavities being of sufficient size and depth to permit free and unobstructed movement of the bolt heads therein.

In a modified form of the invention, as illustrated in FIG. 5, means is provided for enclosing and protecting the bolts 57, 59, 61 and 63, only the bolt 59 being shown. Thus, a bronze or copper receptacle 83 is shown within the cavity 77 in the earth 5. The receptacle 83 includes a bottom wall 85 having a drain hole 86, opposed side walls 87, opposed end walls 89, and an outturned flange 91 extending horizontally outwardly from the upper end of the side and end walls. The upper surface of the outturned flange 91 is in engagement with the lower surface 73 of the slab 1, thus sealing the interior of the receptacle 83 from the surrounding earth 5. The interior of the receptacle 83 is of such dimensions as to permit free, unrestricted movement of the T-shaped head 61 of the bolt 59 in a vertical direction when the tablet 37 is raised and lowered.

The receptacle 83 may be adhesively or otherwise secured to the lower surface 73 of the slab 1 prior to the installation of the slab in the recess 3, or the receptacle 83 may be first placed in the hole or cavity 77 and the slab 1 later placed in the recess 3 and in engagement with the outturned flange 91 of the receptacle 83. It will be understood that each of the other cavities 75, 79 and 81 will also be provided with a receptacle similar to the receptacle 83 just described in connection with FIG. 5, so that each T-bolt will be enclosed.

The upper surface of the tablet 37 is preferably beveled, as at 93 around the perimeter thereof, and the central area 95 confined within the beveled portions may be provided with any suitable inscriptions and designs.

After the lawn 17 has been mowed, in order to "trim" the grass and/or other vegetation remaining closely adjacent to, and which overlies, the upper surface of the tablet 37, the fingers, or a suitable lifting device, is inserted into each of the recesses 27 and 29 to engage the lower surface 47 of the tablet 37, and the tablet is raised vertically to the full extent permitted by the T-bolts to a position free of said vegetation. This vegetation will then assume a position between the upper surface 7 of the slab 1 and the lower surface 47 of the tablet 37. Upon lowering the tablet 37 to its initial or normal position adjacent the upper surface 7 of the slab 1, the vegetation then overlying said concrete slab will be confined and compressed between the lower surface 47 of the tablet 37 and the upper surface 7 of the slab. This will "smother" the vegetation and, moreover, under normal conditions the sun's rays will heat the tablet 37 to a high degree, and the vegetation confined between it and the slab 1 will be oxidized and dried by the heat and thus be quickly destroyed. Thus, a "trimming" operation around the entire periphery of the tablet 37 is accomplished practically instantly with the lowering of the tablet onto the slab 1.

FIG. 6 is a view of a tablet and base similar to that shown in FIGS. 1 to 4, inclusive, but wherein the recesses or notches 27 and 29, providing finger space, have been omitted, and replaced by combined finger notches and guide openings 27a and 29a, that extend throughout the height of the base 1. Also, the bosses at the underside of the tablet 37 have been relocated so that they are in alignment with the guide openings 27a and 29a. Thus, bosses 49a and 55a are shown extending into the guide openings 27a and 29a. T-headed bolts 57a and 59a are mounted in said bosses and project below ground into holes 75a and 77a. It will be understood that the guide openings 27a and 29a are located in the same regions as the recesses 27 and 29; wherefore, only two bolts are required to fasten the tablet 37 to the base 1.

FIGS. 7 to 14, inclusive, illustrate additional embodiments of the invention wherein the tablet or marker plate is larger in size than the base and projects beyond the periphery of the base all the way around so that the lower face of the marker plate can be engaged by the fingers to lift the same, thereby eliminating recesses of the type indicated at 27 and 29, and 27a and 29a, in the edges of the base or slab. It will be understood that, if necessary, some of the earth can be dug away to provide space to insert the fingers beneath the tablets.

More specifically, FIG. 7 illustrates a metal or other marker plate or tablet 96 and a concrete or other base 97, the base being smaller in marginal dimensions than the tablet so that a marginal portion 98 of the tablet extends beyond the edges of the base. The base 97 has only two instead of four guide openings 100, which are located midway between opposite portions of the base. The guide openings 100 are chamfered at their upper ends as indicated at 101 to facilitate receiving guide pins 103. Since the primary purpose of the guide pins 103 is to maintain the tablet 96 and base 97 in registration, the pins need not extend completely through the base and thus can terminate within the guide openings 100. A construction such as just described may be used in areas where vandalism is not a problem and it is unnecessary to take measures, such as using headed bolts, to prevent the tablet 96 from being stolen from the relatively heavy base 97. Also, in the interest of simplicity of construction, the pins 103 can be welded or otherwise bonded to the lower face of the tablet 96.

In use, the tablet 96 is raised to clear any overlying vegetation. This may require lifting the tablet 96 to a height greater than the length of the pins 103. This creates no problem since the tablet 96 can be readily returned to its initial position, using the pins 103 and openings 100 as cooperating guide means. Due to the oversize of the tablet 96 relative to the base 97, the extended marginal portions of the tablet will compress against the earth such previously overlying portions of vegetation as have not been confined between the tablet and base, thus effecting a neat "trimming" job.

FIG. 8 illustrates a construction that is similar to that shown in FIG. 7, except that the guide members 105 are longer and each has a pivoted latch 106 at its lower end, which, after the member has been inserted through the opening 100, can be attached crosswise and locked in such position by a bolt 107. This is a simple arrangement that will prevent the tablet or marker plate 96 from being removed by vandals, and will also limit the movement of the marker plate vertically relative to the base 97. The lower end of the guide members 105 projects into a hole 108.

FIGS. 9 and 10 illustrate a form of the invention, in which a metal or plastic marker plate 109 is made circular and is associated with a circular concrete or other base 111. Here again, the margin 113 of the marker plate 109 extends beyond the periphery of the base 111 to facilitate lifting the plate to "trim" the surrounding lawn. The base 111 has a single guide opening 115 to receive a boss 117 projecting from the marker plate 109. The opening 115 merges into an enlarged portion 118 for receiving the head of a T-bolt 119 having its end threaded into the boss 117.

FIG. 11 illustrates an embodiment of the invention wherein a tablet or marker plate 121 projects beyond the edges of the base 123 throughout the entire circumference of the base and includes a flange portion 125 that projects downwardly from the extended portion of the plate. The flange portion 125 serves as a means for indexing the marker plate 121 with respect to the base 123, and also serves to automatically effect a "trimming" operation as the marker plate 121 is lowered back onto the base 123. In use, the flange portion 125 will depress the previously overlying vegetation and force the same against the earth beneath the flange portion 125, and also assist in confining a portion of the vegetation between the top of the base 123 and the lower side of the marker plate 121, inwardly of the flange portion 125. The flange portion 125 provides convenient means to be engaged by the fingers in lifting the marker plate 121 off the base 123.

FIG. 12 illustrates another embodiment of the invention wherein a marker plate 127 and a base 129 have mutually cooperating indexing means in the form of guide openings 131 in the base 129 and projections 133 extending from the lower side of the marker plate 127. These mutually cooperate to properly index the marker plate 127 with the base 129, after the base has been lifted and then lowered onto the base 129 for effecting a "trimming" operation in the same manner previously described. The marker plate 127 has a marginal portion 128 that projects beyond the edge of the base 129.

FIGS. 13 and 14 illustrate another embodiment of the invention wherein a base 135 has a recess 137 formed in the upper surface thereof that is surrounded by an upstanding flat, marginal portion 139. A cooperating marker plate 141 overlies the base 135 and has flat, marginal portions 143 that extend beyond the edges of the base 135. Projections 145 extend downwardly from the marker plate 141 into the recess 137, being located at diagonally opposite corners of said recess, as illustrated in FIG. 13, for nonrotatably indexing the marker plate 141 with respect to the base 135. Here again, the marker plate 141 can be raised and lowered to automatically effect a "trimming" operation of the surrounding vegetation, in the manner already described.

In all of the embodiments of the invention illustrated and described herein, the top surface of the base is made substantially flat, as is also the lower surface of the tablet or marker plate. However, these surfaces need not be made flat throughout, so long as the portions thereof at their marginal edges lie in a substantially flat plane to provide complementary confronting marginal portions on the tablet and base, and between which the vegetation is confined to effect a trimming operation. It will also be understood that in all embodiments of the invention illustrated and described herein, the tablet or marker plate need only be raised to a sufficient height so that vegetation overlying the tablet assumes a position below the tablet and overlies the base, so that upon lowering of the tablet onto the base, the vegetation is confined at least between the complementary, confronting substantially flat, marginal surfaces of the tablet and base.

Since grass and similar vegetation consists mostly of moisture and includes only a relatively small amount of solid matter, the amount of residue remaining between the tablet 37 and the concrete slab 1 after the vegetation has become dried, will be very small. This residue can be periodically removed; for example, preferably about once a year, some time after the last trimming operation, by raising the tablet 37 and cleaning out all foreign matter from between the opposing surfaces of the tablet and the slab.

While the invention has been described in connection with a number of embodiments thereof, it will be understood that the invention is capable of further modification, and this application is intended to cover any variation, uses, or modifications of the invention following, in general, the principles of the invention.

It will also be apparent that preference of one embodiment over another will vary with the purpose, circumstances and environment in which it is to be used.

I claim:

1. A marker for installation in a lawn area, comprising: a base to be set in the ground in a recess of complementary size with the upper surface thereof positioned substantially at ground level; and a tablet overlying said base and being at least approximately as large as said base, said tablet when in use being free to be raised clear of said base to a sufficient height such that vegetation remaining after cutting of the lawn area and overlying said tablet assumes a position below said tablet and overlies said base, so that upon lowering said tablet onto said base, said vegetation is confined between said tablet and base.

2. A marker for installation in a lawn area, comprising: a base to be set in the ground in a recess of complementary size with the upper surface thereof positioned substantially at ground level, said base having top surface portions at its marginal edges that are substantially flat and lie in a horizontal plane; and a tablet overlying said base, said tablet having bottom surface portions at its marginal edges that are substantially flat and lie in a horizontal plane confronting the flat, top marginal portions on said base, said tablet when in use being free to be raised clear of said base to a sufficient height such that vegetation remaining after cutting of the lawn area and overlying said tablet assumes a position below said tablet and overlies said base, so that upon lowering said tablet onto said base, said vegetation is confined between at least the confronting flat, marginal surfaces of said tablet and base.

3. A marker for installation in a lawn area, comprising: a base to be set in the ground in a recess of complementary size with the upper surface thereof positioned substantially at ground level, said base having a desired marginal edge configuration; and a tablet overlying said base and having a similar configuration, but being larger in size so that its marginal edge extends beyond the marginal edge of said base, said tablet when in use being free to be raised clear of said base, by a lifting force applied to the extended portion of said tablet, to a sufficient height such that vegetation remaining after cutting of the lawn area and overlying said tablet assumes a position below said tablet and overlies said base, so that upon lowering said tablet onto said base, said vegetation is depressed by said extended portion of said tablet, and confined between said tablet and base.

4. A marker, comprising: a base; a tablet approximately as large as said base overlying said base; and means maintaining said tablet and base in registration in said overlying relation and arangement to allow said tablet to be raised vertically relative to said base.

5. A marker, comprising: a base having at least one guide opening extending vertically therein; a tablet approximately as large as said base overlying said base; and means carried by said tablet and extending into said guide opening maintaining said tablet and base in registration in said overlying relation and arranged to provide for vertical raising movement of said tablet relative to said base.

6. A marker, comprising: a base of a desired configuration having at least one guide opening extending vertically therein; a tablet of a configuration and size approximately corresponding to that of said base and overlying said base; and means between said tablet and base providing for vertical raising movement of said tablet relative to said base and including an element extending from said tablet into said guide opening.

7. A marker, comprising: a base of a desired marginal edge configuration; a tablet at least as large as said base overlying said base and having a corresponding marginal edge configuration; and means maintaining said tablet and base in registration in said overlying relation and arranged to allow said tablet to be raised relative to said base.

8. A marker, comprising: a base having at least one guide opening extending vertically therein; a tablet approximately as large as said base overlying said base; and means carried by said tablet and extending into said guide opening maintaining said tablet and base in registration in said overlying relation and providing for raising movement of said tablet relative to said base.

9. A marker, comprising: a base of desired configuration; a tablet of a configuration corresponding to that of said base overlying said base and being at least as large as said base; and means between said tablet and base providing for raising movement of said tablet relative to said base and including an element extending from said tablet into said guide opening.

10. A marker, comprising: a base having at least one opening extending vertically therethrough; a tablet disposed above said base and completely overlying said base; and a headed bolt extending from said tablet into said guide opening, said headed bolt being of a sufficient length to permit relative vertical raising movement of said tablet to a consederable height above said base.

11. A marker as defined in claim 10, wherein a receptacle is positioned in alignment with the guide opening in the base to provide a housing for the headed end of the bolt.

12. A marker, comprising: a base having a plurality of guide openings extending vertically therethrough; a tablet approximately as large as said base overlying said base, said base having recesses in edge portions thereof adjacent to the underside of said tablet to provide access for applying a lifting force to said tablet; and means maintaining said tablet and base in registration and providing for vetical raising movement of said tablet relative to said base.

13. A marker, comprising: a base of a desired marginal edge configuration; a tablet overlying said base and having a similar configuration, but being larger in size so that its marginal edge extends beyond the marginal edge of said base; and means maintaining said tablet and base in registration in said overlying relation and arranged to allow said tablet to be raised vertically relative to said base.

14. A marker, comprising: a base of a desired marginal edge configuration; a tablet overlying said base and having a similar configuration but being larger in size so that its marginal edge extends beyond the marginal edge of said base; and flange means projecting downwardly from the extending marginal edge portion of said tablet maintaining said tablet and base in registration in said overlying relation and allowing said tablet to be raised vertically relative to said base.

15. A marker, comprising: a base member of a desired marginal edge configuration; a tablet member overlying said base and having a similar configuration but being larger in size so that its marginal edge projects beyond the marginal edge of said base; and projecting means on one of said members and recess means on the other of said members receiving said projecting means and maintaining said tablet and base in registration in said overlying relation and allowing said tablet to be raised vertically relative to said base.

16. A marker, comprising: a base having a pair of guide openings extending vertically therein; a tablet approximately as large as said base overlying said base; and a pair of pins carried by said tablet and extending into said guide opening maintaining said tablet and base in registration in said overlying relation and providing for vertical raising movement of said tablet relative to said base.

17. A marker for use in a lawn area, comprising: a rigid slab adapted to be set horizontally in the ground in a recess of complementary size with the upper surface thereof positioned substantially at ground level, said slab having guide opening means extending vertically therethrough; a tablet of at least the same configuration and surface area as said slab disposed above said slab for movement between a normal lowered position adjacent said slab and a raised position spaced vertically above said slab; and means extending through said guide opening means and being fixedly secured to said tablet connecting said slab and said tablet together for limited vertical movement of said tablet relative to said slab, said connecting means including abutment means spaced below the lower surface of said slab when said tablet is disposed in said normal position, and engaging the lower surface of said slab when said tablet is in said raised position, whereby when said marker is in use movement of said tablet from said normal position to said raised position results in vegetation, remaining after mowing of the lawn area and overlying said tablet, assuming a position between said slab and said tablet and overlying said slab, and return movement of said tablet from said raised to said normal position confines said overlying vegetation between said slab and said tablet.

18. A marker for use in a lawn area, comprising: a slab adapted to be set horizontally in the ground in a recess of complementary size with the upper surface thereof positioned substantially at ground level, said slab having a plurality of guide openings extending vertically therethrough; a tablet of substantially the same configuration and surface area as said slab disposed above said slab for movement between a normal lowered position adjacent said slab and a raised position spaced above said slab; and means extending through each of said guide openings and being fixedly secured to said tablet connecting said slab and said tablet together for limited vertical movement of said tablet relative to said slab, each of said connecting means including an abutment portion located below the lower surface of said slab when said tablet is disposed in said normal position, and engaging the lower surface of said slab when said tablet is in said raised position, whereby when said marker is in use movement of said tablet from said normal position to said raised position results in vegetation previously overlying said tablet assuming a position between said slab and said tablet and overlying said slab, and movement of said tablet from said raised to said normal position confines said overlying vegetation between said slab and said tablet.

19. A marker for use in a lawn area, comprising: a concrete slab adapted to be set horizontally in the ground in a recess of complementary size with the upper surface thereof positioned substantially at ground level, said slab having a plurality of guide openings extending vertically therethrough; a metal tablet of substantially the same configuration and surface area as said slab disposed above said slab for movement between a normal lowered position seated on said slab and a raised position spaced above said slab; and a member having an abutment thereon extending through each of said guide openings and being fixedly secured to said tablet, the abutment of each of said members being larger than the respective guide openings and being located below the lower surface of said slab and received in a cavity formed in the ground when said tablet is disposed in said normal position, said abutments engaging the lower surface of said slab when said tablet is in said raised position, whereby when said marker is in use movement of said tablet from said normal position to said raised position results in vegetation previously overlying said tablet assuming a position between said slab and said tablet and overlying said slab, and movement of said tablet from said raised to said normal position confines and compresses said overlying vegetation between said slab and said tablet.

20. A marker as defined in claim 19, wherein the abutment can be pivoted relative to the member.

21. A marker for use in a lawn area, comprising: a slab to be set horizontally in the ground in a recess of complementary size with the upper surface thereof positioned substantially at round level, said slab having a plurality of guide openings extending vertically therethrough; a marker tablet disposed above said slab for movement between a normal lowered position adjacent said slab and a raised position spaced above said slab, said tablet having guide members extending downward from the lower side thereof in alignment with said guide openings, said guide members being smaller than said guide openings for free vertical movement therein; and an abutment carried by each of said guide members and being larger than the respective guide openings, said abutments engaging the lower surface of said slab when said tablet is in said raised position for limiting upward movement of said tablet, said tablet and slab having mutually cooperating means providing access to the lower side of said tablet for raising the same, whereby when said marker is in use movement of said tablet from said normal position to said raised position results in vegetation previously overlying said tablet assuming a position between said slab and said tablet and overlying said slab, and movement of said tablet from said raised to said normal position confines and compresses said vegetation between said slab and said tablet.

22. A grave marker for lawn type cemeteries, comprising: a concrete slab adapted to be set horizontally in the ground in a recess of complementary size with the upper surface thereof positioned substantially at ground level, said slab having a plurality of guide openings extending vertically therethrough; a memorial marker tablet of substantially the same configuration and surface area as said slab disposed above said slab for movement between a normal lowered position seated on said slab and raised position spaced above said slab, said tablet having guide lugs rigid therewith extending downward from the lower surface thereof in alignment with said guide openings, said guide lugs being slightly smaller than said guide openings for free vertical movement therein; and means extending through each of said guide openings and being fixedly secured to each of said lugs connecting said slab and said tablet together for limited vertical movement of said tablet, each of said connecting means including an abutment potrion located below the lower surface of said slab when said tablet is disposed in said normal position, and engaging the lower surface of said slab when said tablet is in said raised position, whereby when said marker is in use movement of said tablet from said normal position to said raised position results in vegetation previously overlying said tablet assuming a position between said slab and said tablet and overlying said slab, and movement of said tablet from said raised to said normal position confines and compresses said overlying vegetation between said slab and said tablet.

23. A grave marker for lawn type cemeteries, comprising: a concrete slab adapted to be set horizontally in the ground in a recess of complementary size with the upper surface thereof positioned substantially at ground level, said slab having a plurality of guide openings extending vertically therethrough; a memorial marker tablet of substantially the same configuration and surface area as said slab disposed above said slab for movement between a normal lowered position seated on said slab and a raised position spaced above said slab, the upper surface of said slab, at opposite extremities thereof, being recessed to provide a lift space beneath said tablet for affording access to the lower surface of said tablet for raising the same; and means extending through each of said guide openings and being fixedly secured to said tablet connecting said slab and said tablet together for limited vertical movement of said tablet relative to said slab, each of said connecting means including an abutment portion disposed below the lower surface of said slab when said tablet is disposed in said normal position, and engaging the lower surface of said slab when said tablet is in said raised position, whereby when said marker is in use movement of said tablet from said normal position to said raised position results in vegetation previously overlying said tablet assuming a position between said slab and said tablet from said raised to said normal poition confines and compresses said overlying vegetation between said slab and said tablet.

References Cited

UNITED STATES PATENTS

| | | | |
|---|---|---|---|
| 1,995,771 | 3/1935 | Gruanberg | 40—124.5 |
| 2,095,290 | 10/1937 | Roy | 40—124.5 |
| 2,148,660 | 2/1939 | Sweeney | 40—124.5 |
| 3,082,559 | 3/1963 | Davis | 40—124.5 |

EUGENE R. CAPOZIO, *Primary Examiner.*

W. J. CONTRERAS, *Examiner.*